United States Patent
Tsirkin

(10) Patent No.: US 8,429,322 B2
(45) Date of Patent: Apr. 23, 2013

(54) HOTPLUG REMOVAL OF A DEVICE IN A VIRTUAL MACHINE SYSTEM

(75) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 345 days.

(21) Appl. No.: 12/912,163

(22) Filed: Oct. 26, 2010

(65) Prior Publication Data
US 2012/0102252 A1    Apr. 26, 2012

(51) Int. Cl.
*H05K 7/10*   (2006.01)

(52) U.S. Cl.
USPC .............................. 710/302; 718/1; 718/106

(58) Field of Classification Search ...... 718/1, 100–108; 710/302, 304
See application file for complete search history.

(56) References Cited

U.S. PATENT DOCUMENTS

| | | | |
|---|---|---|---|
| 7,313,637 B2* | 12/2007 | Tanaka et al. ..................... | 710/8 |
| 8,001,368 B2* | 8/2011 | Tabuchi ............................ | 713/1 |
| 8,151,265 B2* | 4/2012 | Ben-Yehuda et al. ............ | 718/1 |
| 8,301,818 B2* | 10/2012 | Zou et al. ........................ | 710/302 |
| 8,321,617 B1* | 11/2012 | Haga ............................... | 710/302 |
| 2004/0187106 A1* | 9/2004 | Tanaka et al. ..................... | 718/1 |
| 2006/0064523 A1* | 3/2006 | Moriki et al. ..................... | 710/62 |
| 2007/0271404 A1* | 11/2007 | Dearth et al. ................... | 710/302 |
| 2009/0164990 A1* | 6/2009 | Ben-Yehuda et al. ............ | 718/1 |
| 2009/0307689 A1* | 12/2009 | Sudhakar .......................... | 718/1 |
| 2012/0030669 A1* | 2/2012 | Tsirkin ............................. | 718/1 |
| 2012/0246644 A1* | 9/2012 | Hattori et al. .................... | 718/1 |
| 2012/0278818 A1* | 11/2012 | Green et al. .................... | 719/321 |

OTHER PUBLICATIONS

VMware Inc. vSphere PowerCLI Cmdlets Reference. Remove-UsbDevice. 2010.*
VMware Inc. vSphere Virtual Machine Administration. Update 1. 2012.*
Iwamatsu, Yosuke. PCI Hot-Plug for PV Domains. NEC Corporation. 2008.*

* cited by examiner

*Primary Examiner* — Matthew D Spittle
(74) *Attorney, Agent, or Firm* — Lowenstein Sandler LLP

(57) ABSTRACT

A method and system for hotplug removing a device in a virtual machine system. A computer system hosts a virtual machine that runs a guest. A hotplug manager in the computer system sends a request to the guest for hotplug removal of a device associated with the guest. The hotplug manager detects an indication of reboot of the guest, and completes the hotplug removal in response to detection of the reboot.

20 Claims, 4 Drawing Sheets

HOTPLUG REMOVAL OF A DEVICE IN A VIRTUAL MACHINE SYSTEM

TECHNICAL FIELD

Embodiments of the present invention relate to a computer system, and more specifically, to management of hotplug removal of a device in a virtual machine system.

BACKGROUND

"Hotplugging" refers to the capability of adding, removing, or replacing a device in a computer system without shutting down or rebooting the computer system. A well-known example of hotplugging is the Universal Serial Bus (USB) or the Peripheral Component Interconnect (PCI) Express that allows users to add or remove peripheral components such as storage components during operation of a computer system.

Before a hotplug device can be removed or replaced, a system administrator needs to unconfigure the device. The device driver associated with the device needs to free any system resources (e.g., memory) that have been allocated for the device. The device driver also needs to ensure that interrupts and I/O are disabled on the device. The guest operating system needs to synchronize with the device, for example, complete writing out data to a storage device.

A virtual machine system can also provide hotplug capabilities. In a virtual machine system, it is possible to hotplug remove a device (which can be a physical device or an emulated device) that is controlled by a guest running on a virtual machine. To safely remove the device, a hypervisor typically sends a request to the guest and waits for an acknowledgment from the guest. However, if the guest is rebooted before responding to the request, the hypervisor may receive an acknowledgment from the guest after a long delay, or may not receive an acknowledgment at all. Thus, the rebooting of a guest often causes problems in hotplugging.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for hotplug removing a device in a virtual machine system. In one embodiment, a computer system hosts a virtual machine that runs a guest. A hotplug manager in the computer system sends a request to the guest for hotplug removal of a device associated with the guest. The hotplug manager detects an indication of reboot of the guest, and completes the hotplug removal in response to detection of the reboot. In one embodiment, the hotplug manager is part of the hypervisor that runs on the computer system.

Throughout the following description, the term "device" is used to refer to a physical hardware device, or an emulated device that is emulated by a hypervisor. The device can be used and controlled by a guest that runs on a virtual machine. The term "hotplug removal" refers to the removal of a device from the control of the guest without having to shut down a computer system or reboot the virtual machine. The term "guest" refers to the software that runs or can run on the hypervisor that is installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

Embodiments of the present invention allow a device to be hotplug removed efficiently when the guest is undergoing a reboot process that is not required by the hotplug removal. Once the hypervisor detects a guest reboot, the hypervisor can complete the hotplug without waiting for the guest to respond to the hypervisor's hotplug request. As a result, the device can be safely removed from the control of the guest without delay.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
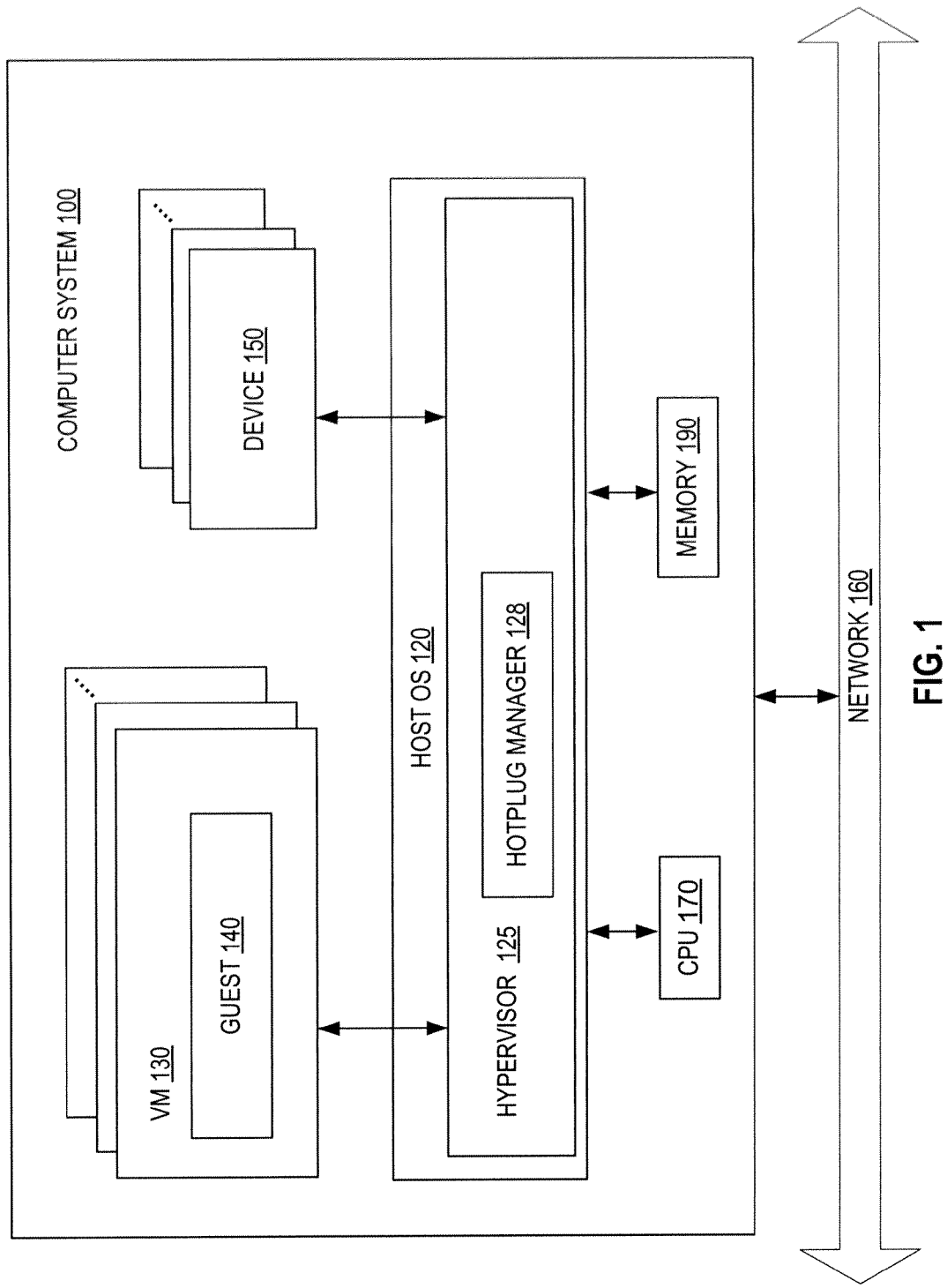
FIG. 1 is a block diagram of a computer system in which a device can be hotplug removed from a guest that runs on a virtual machine.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also runs a host OS 120 to manage system resources. In one embodiment, the computer system 100 runs a hypervisor 125 to virtualize access to the underlying host hardware, making the use of the virtual machine 130 transparent to the guest 140 and the users of the computer system 100. The hypervisor 125 may also be known as a virtual machine monitor (VMM) or a kernel-based hypervisor. In some embodiments, the hypervisor 125 may be part of the host OS 120.

In one embodiment, the computer system 100 is accessible by remote systems via a network 160. The network 160 may be a private network (e.g., a local area network (LAN), a wide area network (WAN), intranet, etc.) or a public network (e.g., the Internet). The computer system 100 also includes hardware components such as one or more physical central processing units (CPUs) 170, memory 190 and other hardware components.

In one embodiment, the computer system 100 also includes one or more devices (e.g., device 150) which may include physical hardware devices and emulated devices that are emulated by the hypervisor 125. Although not shown in the embodiment of FIG. 1, some of the devices may be internal to the computer system 100 and some of the devices may be external and coupled to the computer system 100. Examples of the devices include network interface cards (NICs), storage devices, sound or video adaptors, photo/video cameras, printer devices, and any devices that can be emulated or assigned to and used by the guest 140.

In one embodiment, one of the devices (e.g., the device 150) may be removed from the guest 140 during operation of the guest 140, without shutting down the computer system 100 or rebooting the virtual machine 130. Such removal is called "hotplug removal." In one scenario, the device 150 may be removed in response to a system administrator's command or an event that triggers the guest 140 to release control of the device 150. The device 150 may be removed for reuse by another guest, for repair, or for other purposes. Before the device 150 can be safely removed, the hypervisor 125 needs to check with the guest 140 whether the device 150 is currently in use. In one embodiment, the hypervisor 125 sends a hotplug request to the guest 140 upon receiving the command to remove the device 150 from the guest 140.

According to one embodiment of the present invention, the hypervisor 125 includes a hotplug manager 128 to manage the hotplug removal of the device 150. In one embodiment, if the guest 140 is rebooted or otherwise crashes before responding to the hotplug request, the hotplug manager 128 detects the guest reboot, and performs necessary operations to complete the hotplug, without waiting for an acknowledgment from the guest 140.

Figure 2:
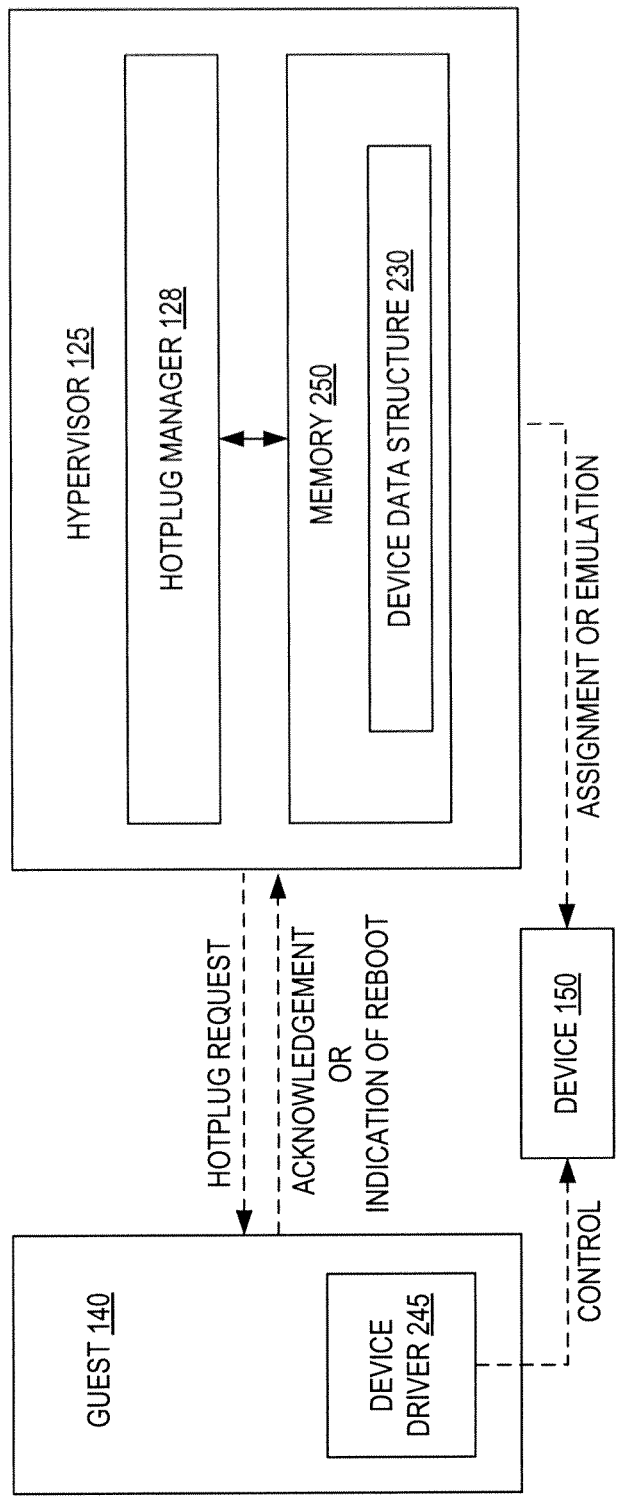
FIG. 2 illustrates an example of an interaction between a hypervisor and a guest from which a device is to be hotplug removed.

FIG. 2 illustrates an example of an interaction between the hypervisor 125 and the guest 140, from which the device 150 is to be hotplug removed. The device 150 may be a physical device assigned by the hypervisor 125 to the guest 140, or an emulated device that is emulated by the hypervisor 125 for the guest 140. The hypervisor 125 may maintain a device data structure 230 in data storage (e.g., memory 250) that is allocated to the guest 140 for the use of the device 150. The device data structure 230 is accessible to the hotplug manager 128, and may be used for emulation of the device 150, for mediating the guest's access to the device 150, and/or for other device management purposes. The guest 140 may control the device 150 through a device driver 245. In one embodiment, before the device 150 is to be hotplug removed from the guest 140, the hypervisor 125 sends a hotplug request to the guest 140. In one scenario, the guest 140 sends back an acknowledgment. In an alternative scenario, the guest 140 may experience a crash after the hotplug request arrives at the guest 140, and may start a reboot process. The hotplug request triggers an interrupt in the guest 140. When the guest 140 crashes, the guest 140 may have already cleared the interrupt, or may have just begun to handle the interrupt. If the guest 140 has already cleared the interrupt when it crashes, the guest 140 will not remember the existence of the interrupt after the reboot and will not send an acknowledgment to the hypervisor 125 at all. If the guest 140 has just begun to handle the interrupt (before clearing the interrupt) when it crashes, the guest 140 may eventually send the acknowledgment to the hypervisor 125 with a long delay after the reboot.

In one embodiment, the hypervisor 125 completes the hotplug removal operation when the hypervisor 125 either receives the guest's acknowledgment or detects the guest reboot. The hypervisor 125 may complete the hotplug removal operation by freeing up the device data structure 230 in its memory 250 that is allocated to the guest 140, and removing control of the device 150 from the guest 140. In one scenario, the hypervisor 125 can detect an indication of guest reboot by monitoring the guest's commands (the term "command" is used interchangeably with "instruction") to be executed on the CPU. In another scenario, the hypervisor 125 can trigger a guest reboot (e.g., by resetting the guest 140 and the virtual machine 130 on which the guest 140 runs) and, therefore, can detect an indication of guest reboot by tracking its own commands. In yet another scenario, an external source such as a keyboard or an Advanced Programmer Interrupt Controller (APIC) can generate an interrupt to trigger guest reboot. The hypervisor 125 can trap the interrupt and detect an indication of guest reboot. The indication of guest reboot may be in the form of a guest reset (the term "reset" is used interchangeably with "reboot"), a system reset, a power down command, or a CPU reset command. The command may be sent to the CPU for execution in the form of a register write, port write, etc. The hypervisor 125 can trap the command, and emulate the execution of the command; for example, by powering down or resetting the virtual machine 130 on which the guest 140 runs. By trapping the guest's commands, the hypervisor 125 is able to detect commands that cause the guest 140 to reboot, and, therefore, is able to detect the guest reboot.

Figure 3:
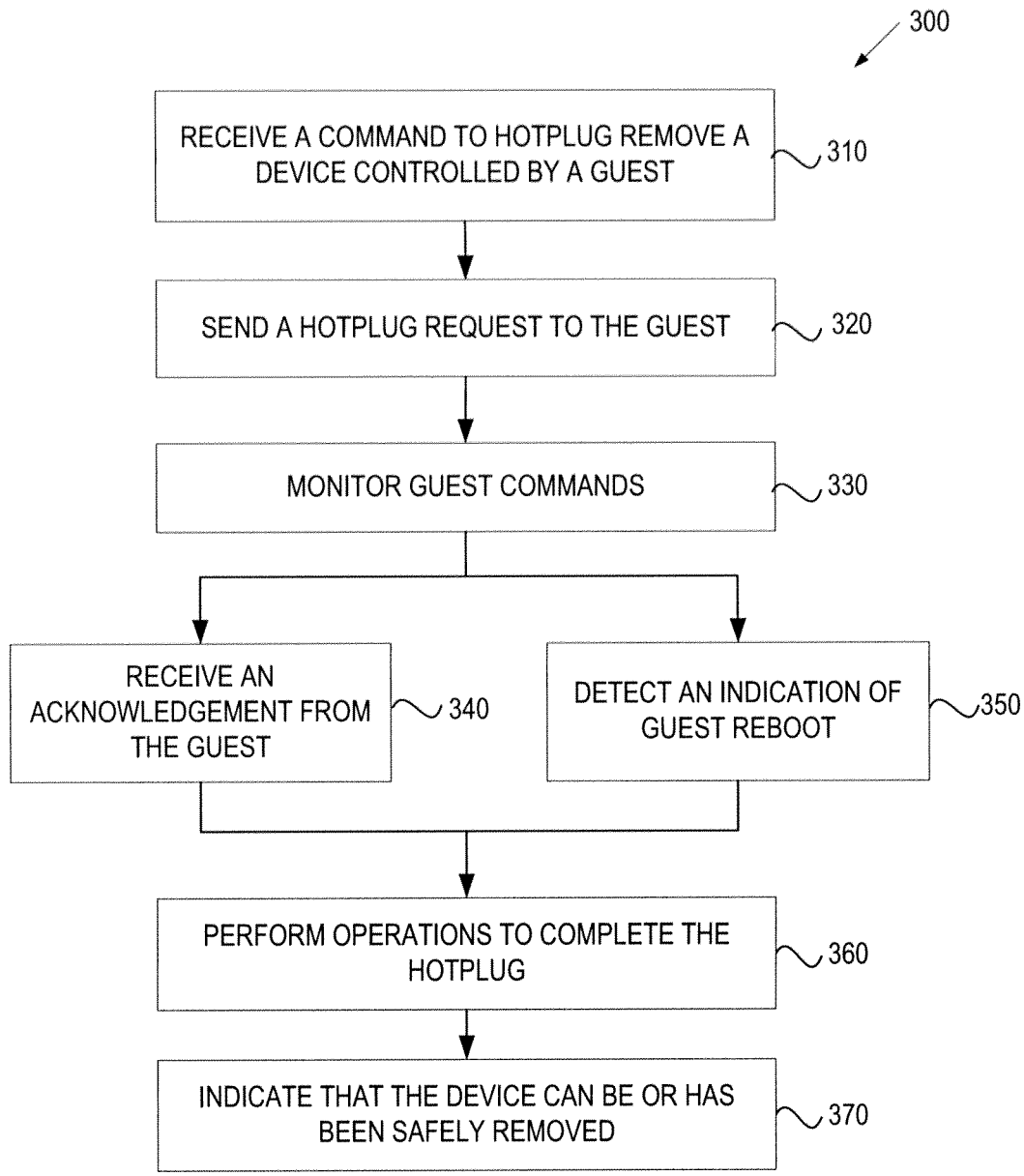
FIG. 3 is a flow diagram of one embodiment of a method for hotplug removal of a device that is associated with a guest.

FIG. 3 is a flow diagram illustrating one embodiment of a method 300 for hotplug removing a device that is associated with a guest. The method 300 may be performed by a computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the hotplug manager 128 in the hypervisor 125 of FIG. 1 and FIG. 2.

Referring to FIG. 3, in one embodiment, the method 300 begins when the hotplug manager 128 receives a command to remove the device 150 from the guest 140 (block 310). The command may be from a system administrator, a management application, or other sources. In response, the hotplug manager 128 sends a hotplug request to the guest 140, indicating that the device 150 is to be removed from the control of the guest 140 (block 320). Before the hotplug manager 128 receives an acknowledgment from the guest 140, the hotplug manager 128 also monitors the commands issued from the guest 140 that are to be executed on the CPU 170 (block 330). If the hotplug manager 128 receives an acknowledgment from the guest 140 (block 340), the hotplug manager 128 will perform necessary operations (e.g., free the device data structure 230 in the memory 250) to complete the hotplug (block 360). If the hotplug manager 128 detects a guest reboot command (block 350) before an acknowledgment is received from the guest 140, the hotplug manager 128 will also perform the necessary operations (e.g., free the device data structure 230 in the memory 250) to complete the hotplug (block 350). The hotplug manager 128 then sends an indication to the source of the hotplug command (e.g., by sending or displaying a message on the control console of a system administrator), indicating that the device 150 can be (if it is a physical device), or has been (if it is an emulated device), safely removed from the guest 140 (block 370). As a result, a device can be hotplug removed from the control of a guest without delay even when the guest needs to be rebooted during the hotplugging process.

Figure 4:
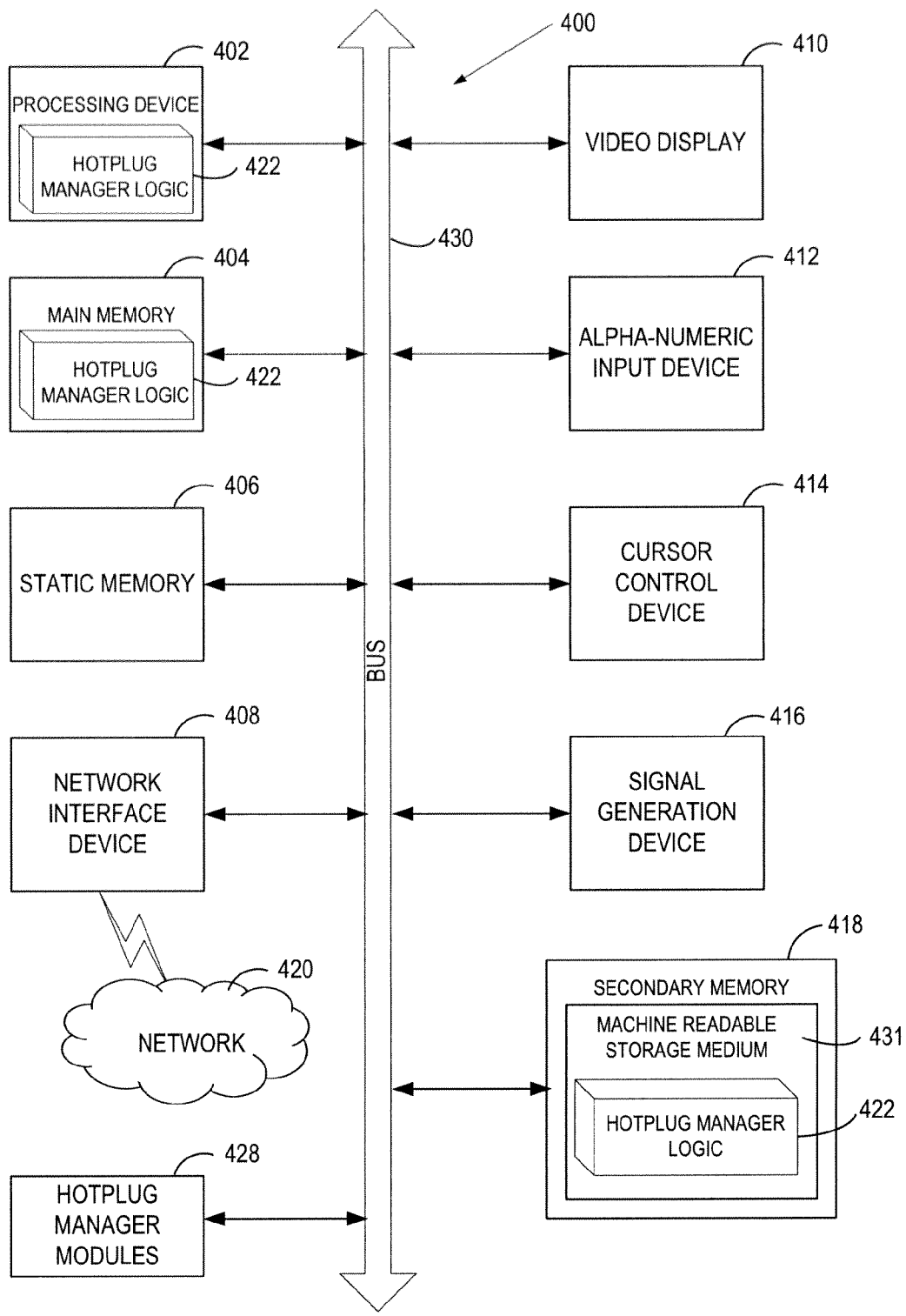
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute hotplug manager logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., hotplug manager logic 422) embodying any one or more of the methodologies or functions described herein (e.g., the hotplug manager 128 and the hypervisor 125 of FIGS. 1 and 2). The hotplug manager logic 422 may also reside, completely or at least partially, within the main memory 404 and/or within the processing device 402 during execution thereof by the computer system 400; the main memory 404 and the processing device 402 also constituting machine-readable storage media. The hotplug manager logic 422 may further be transmitted or received over a network 420 via the network interface device 408.

The machine-readable storage medium 431 may also be used to store the hotplug manager logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 400 may additionally include hotplug manager modules 428 for implementing the functionalities of the hotplug manager 128 and the hypervisor 125 of FIGS. 1 and 2. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "detecting", "completing", "monitoring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a computer system, comprising:
    sending, by the computer system, a request to a guest that runs on a virtual machine hosted by the computer system for hotplug removal of a device associated with the guest;
    detecting, by the computer system, an indication of reboot of the guest; and
    completing the hotplug removal in response to detection of the reboot.

2. The method of claim 1, wherein detecting an indication of reboot of the guest further comprises:
    monitoring, by a hypervisor in the computer system, commands issued from the guest.

3. The method of claim 1, wherein detecting an indication of reboot of the guest further comprises:
    trapping, by a hypervisor in the computer system, a command issued from the guest, the command indicating that the guest is to be rebooted.

4. The method of claim 3, wherein the command is a power down command or a reboot command.

5. The method of claim 1, wherein detecting an indication of reboot of the guest further comprises:
    trapping, by a hypervisor in the computer system, an interrupt generated by a source external to the guest, the interrupt indicating that the guest is to be rebooted.

6. The method of claim 1, wherein detecting an indication of reboot of the guest further comprises:
    initiating, by a hypervisor in the computer system, the reboot of the guest by resetting the guest and the virtual machine.

7. The method of claim 1, wherein a hypervisor in the computer system completes the hotplug removal of the device without waiting for a response to the request from the guest.

8. A system comprising:
    a computer system that host a virtual machine that runs a guest, the computer system includes a hotplug manager that sends a request to the guest for hotplug removal of a device associated with the guest, detects an indication of reboot of the guest, and completes the hotplug removal in response to detection of the reboot; and
    data storage to store a data structure that is accessible by the hotplug manager for management of the device for the guest.

9. The system of claim 8, wherein the hotplug manager is part of a hypervisor in the computer system.

10. The system of claim 8, wherein a hypervisor in the computer system traps a command issued from the guest, wherein the command indicates that the guest is to be rebooted.

11. The system of claim 8, wherein a hypervisor in the computer system traps an interrupt generated by a source external to the guest, wherein the interrupt indicates that the guest is to be rebooted.

12. The system of claim 8, wherein a hypervisor in the computer system initiates the reboot of the guest by resetting the guest and the virtual machine.

13. The system of claim 8, wherein the device is a physical hardware device.

14. The system of claim 8, wherein the device is an emulated device that is emulated by a hypervisor in the computer system.

15. A non-transitory computer readable storage medium including instructions that, when executed by a computer system, cause the computer system to perform a method comprising:
    sending a request, to a guest that runs on a virtual machine hosted by the computer system, for hotplug removal of a device associated with the guest;
    detecting an indication of reboot of the guest; and
    completing the hotplug removal in response to detection of the reboot.

16. The computer readable storage medium of claim 15, wherein detecting an indication of reboot of the guest further comprises:
    trapping, by a hypervisor in the computer system, a command issued from the guest, the command indicating that the guest is to be rebooted.

17. The computer readable storage medium of claim 15, wherein detecting an indication of reboot of the guest further comprises:
    trapping, by a hypervisor in the computer system, an interrupt generated by a source external to the guest, the interrupt indicating that the guest is to be rebooted.

18. The computer readable storage medium of claim 15, wherein detecting an indication of reboot of the guest further comprises:
    initiating, by a hypervisor in the computer system, the reboot of the guest by resetting the guest and the virtual machine.

19. The computer readable storage medium of claim 15, wherein the indication of reboot is a power down command or a reboot command.

20. The computer readable storage medium of claim 15, wherein a hypervisor in the computer system completes the hotplug removal of the device without waiting for a response to the request from the guest.

* * * * *